United States Patent
Jeon et al.

(10) Patent No.: US 11,135,536 B2
(45) Date of Patent: Oct. 5, 2021

(54) PURIFICATION DEVICE

(71) Applicant: LG ELECTRONICS INC., Seoul (KR)

(72) Inventors: Jewook Jeon, Seoul (KR); Jingyu Ji, Seoul (KR); Minho Kim, Seoul (KR); Youngseok Kim, Seoul (KR); Hoon Jang, Seoul (KR); Soonki Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 16/114,709

(22) Filed: Aug. 28, 2018

(65) Prior Publication Data
US 2019/0060805 A1 Feb. 28, 2019

(30) Foreign Application Priority Data
Aug. 28, 2017 (KR) .................. 10-2017-0108888

(51) Int. Cl.
*B01D 35/30* (2006.01)
*C02F 1/00* (2006.01)
(Continued)

(52) U.S. Cl.
CPC .......... *B01D 35/303* (2013.01); *B01D 35/04* (2013.01); *C02F 1/003* (2013.01); *B01D 35/18* (2013.01); *B01D 2201/0415* (2013.01); *B01D 2201/0423* (2013.01); *B01D 2201/301* (2013.01); *C02F 2201/004* (2013.01); *C02F 2201/005* (2013.01); *C02F 2201/007* (2013.01)

(58) Field of Classification Search
CPC .... B01D 2201/0415; B01D 2201/0423; B01D 2201/301; B01D 35/04; B01D 35/18; B01D 35/303; C02F 1/003; C02F 2201/004; C02F 2201/005; C02F 2201/007
See application file for complete search history.

(56) References Cited

U.S. PATENT DOCUMENTS 3,985,272 A 10/1976 Rodth
2007/0017376 A1 1/2007 Oehninger
(Continued)

FOREIGN PATENT DOCUMENTS

AU 2017423559 2/2019
AU 2018220139 3/2019
(Continued)

OTHER PUBLICATIONS

Korean Office Action dated Oct. 10, 2019 issued in KR Application No. 10-2019-0089180.
(Continued)

*Primary Examiner* — Dirk R Bass
(74) *Attorney, Agent, or Firm* — KED & Associates LLP

(57) ABSTRACT

The present disclosure provides a purification device comprising: a main body, and a water-outlet module, wherein the module includes a fixed cover fixed to the main body so as to protrude forward of the main body, a vertically-movable cover moving vertically while bearing against the fixed cover, and a water-outlet nozzle mounted on a bottom of the vertically-movable cover, wherein a stopping protrusion protrudes outward from a bottom lateral face of the vertically-movable cover.

12 Claims, 10 Drawing Sheets

(51) Int. Cl.
*B01D 35/04* (2006.01)
*B01D 35/18* (2006.01)

(56) References Cited

U.S. PATENT DOCUMENTS

| | | | | |
|---|---|---|---|---|
| 2014/0251498 | A1* | 9/2014 | Park | F25D 23/126 |
| | | | | 141/258 |
| 2017/0050836 | A1* | 2/2017 | Yoon | B67D 1/0004 |
| 2017/0153056 | A1 | 6/2017 | Kim et al. | |
| 2019/0060803 | A1 | 2/2019 | Jeon et al. | |

FOREIGN PATENT DOCUMENTS

| | | |
|---|---|---|
| CN | 102485310 | 6/2012 |
| CN | 204601792 | 9/2015 |
| CN | 105311964 | 2/2016 |
| CN | 205182341 | 4/2016 |
| CN | 106256766 | 12/2016 |
| DE | 29810291 | 9/1998 |
| KR | 10-0650666 | 11/2006 |
| KR | 10-2010-0054580 | 5/2010 |
| KR | 10-1381803 | 4/2014 |
| KR | 10-2015-0004669 | 1/2015 |
| KR | 10-1645093 | 8/2016 |
| KR | 10-2017-0063454 | 6/2017 |

OTHER PUBLICATIONS

Australian Office Action dated May 3, 2019 issued in AU Application No. 2018222909.
United States Office Action dated Apr. 13, 2020 issued in U.S. Appl. No. 16/114,915.
United States Office Action dated Apr. 7, 2020 issued in U.S. Appl. No. 16/114,827.
U.S. Appl. No. 16/114,767, filed Aug. 28, 2018.
U.S. Appl. No. 16/110,252, filed Aug. 23, 2018.
U.S. Appl. No. 16/114,827, filed Aug. 28, 2018.
U.S. Appl. No. 16/114,915, filed Aug. 28, 2018.
U.S. Appl. No. 16/114,709, filed Aug. 28, 2018.
Korean Office Action dated Jul. 20, 2018 issued in KR Application No. 10-2017-0110412.
Korean Office Action dated Jul. 20, 2018 issued in KR Application No. 10-2017-0107574.
Korean Office Action dated Jul. 20, 2018 issued in KR Application No. 10-2017-0108888.
U.S. Appl. No. 16/923,865, filed Jul. 8, 2020.
U.S. Appl. No. 16/144,709, filed Aug. 28, 2018.
Chinese Office Action dated Mar. 18, 2021 issued in CN Application No. 201810986925.6.

* cited by examiner

PURIFICATION DEVICE

CROSS-REFERENCE TO RELATED APPLICATIONS

This application claims priority under 35 U.S.C. § 119 to Korean Patent Application No. 10-2017-0108888 filed on Aug. 28, 2017, whose entire disclosure is hereby incorporated by reference. This application is related to U.S. application Ser. No. 16/114,767, filed Aug. 28, 2018, U.S. application Ser. No. 16/110,252, filed Aug. 23, 2018, U.S. application Ser. No. 16/114,827, filed Aug. 28, 2018, and U.S. application Ser. No. 16/114,915, filed Aug. 28, 2018, whose disclosures are also incorporated by reference.

BACKGROUND

1. Field

The present disclosure relates to a purification device.

2. Background

Generally, a purification device filters water to remove impurities therefrom and is widely used in the home. Specifically, the purification device may be connected to a tap water supply and may remove floating or harmful components contained in tap water using a filter. The purification device may be configured to discharge a desired amount of water by manipulation of a user.

Nowadays, a variety of the above-described purification devices having water purification function and discharge function of hot water and cold water are being introduced. In recent years, the purification device has been developed which may be small and thus installed in various installation environment.

BRIEF DESCRIPTION OF THE DRAWINGS

The embodiments will be described in detail with reference to the following drawings in which like reference numerals refer to like elements wherein.

DETAILED DESCRIPTIONS

Figure 1:
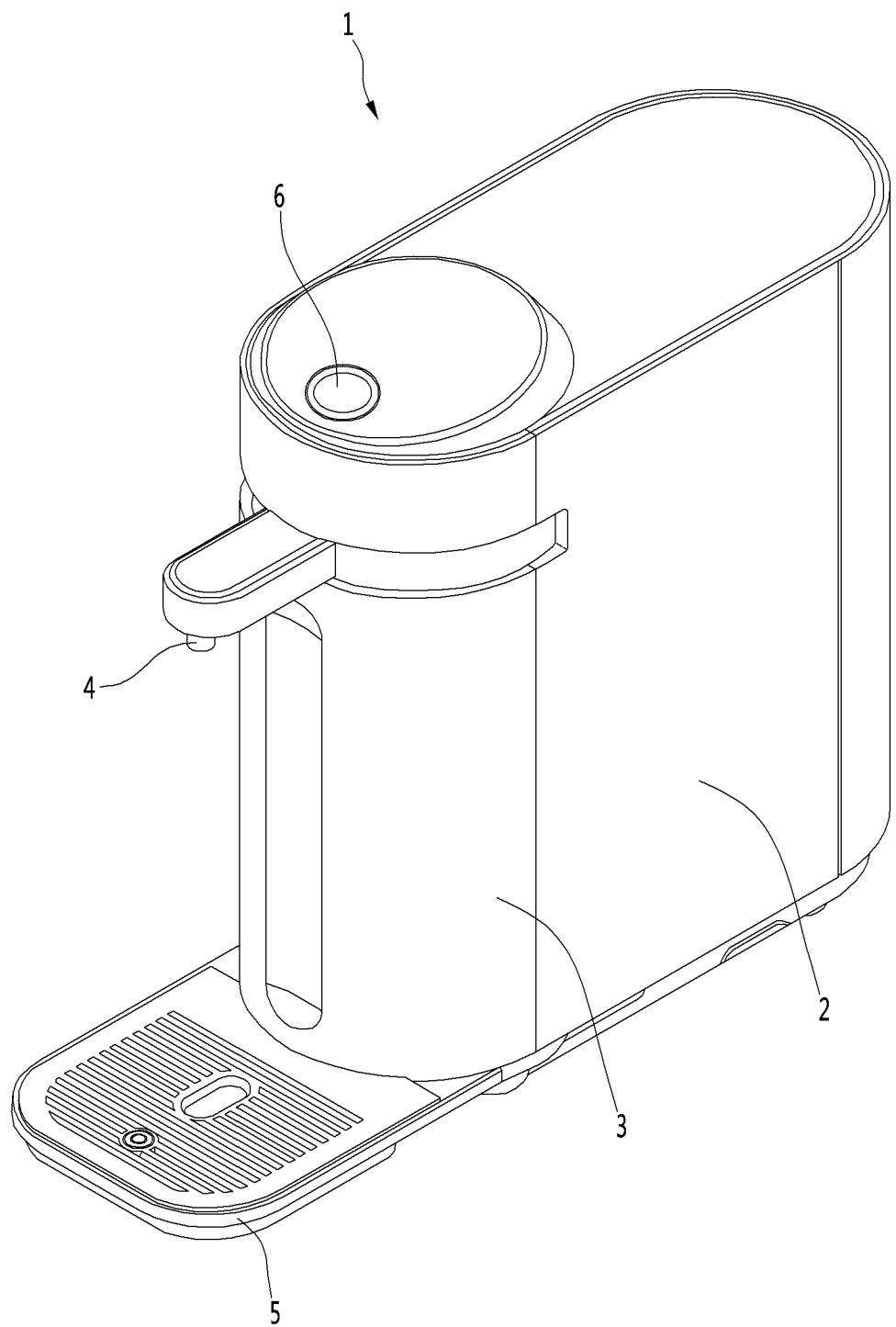
FIG. 1 is a perspective view showing one example of a conventional purification device.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Hereinafter, a purification device 1 will be described with reference to FIG. 1. The purification device 1 includes a cabinet 2 and a dispenser 3 both defining the appearance of the device. In this connection, the dispenser 3 means the space where the user is supplied with edible water. Thus, in general, the dispenser 3 is formed in front of the cabinet 2.

In addition, the dispenser 3 is provided with a water-outlet nozzle 4 through which water is discharged. Below the water-outlet nozzle 4, a tray 5 on which a water cup is placed is formed. In this state, when the user manipulates a lever or button 6, the stored water may be discharged through the water-outlet nozzle 4. That is, when the user manipulates the lever or button 6, a valve of the water-outlet nozzle 4 is opened, and, thus, the water is discharged. The user finishes the manipulation of the lever or button 6 while checking the amount of water as filled in the cup or container.

In the purification device 1 of FIG. 1, the vertical level of the water-outlet hole, that is, the water-outlet nozzle 4 is constant. However, in the purification device 1 as described above, when a water cup is placed on the tray and water is discharged out, the discharged water falls into the water cup and splashes out of the water cup due to the vertical level difference between the water-outlet hole and the water cup. Particularly, in the case of a water cup having a small height, a greater amount of water may splash out of the water cup.

To solve this problem, when the vertical level of the water-outlet hole is lowered, the water cup or water bottle with a larger height may be inserted and received between the tray and the water-outlet hole. Accordingly, the purification device 1 may be equipped with a vertically movable water-outlet nozzle so as to control a vertical level of the water-outlet hole. Furthermore, when the user lowers the water-outlet nozzle, measures may be included to prevent the grip slippage.

Figure 2:
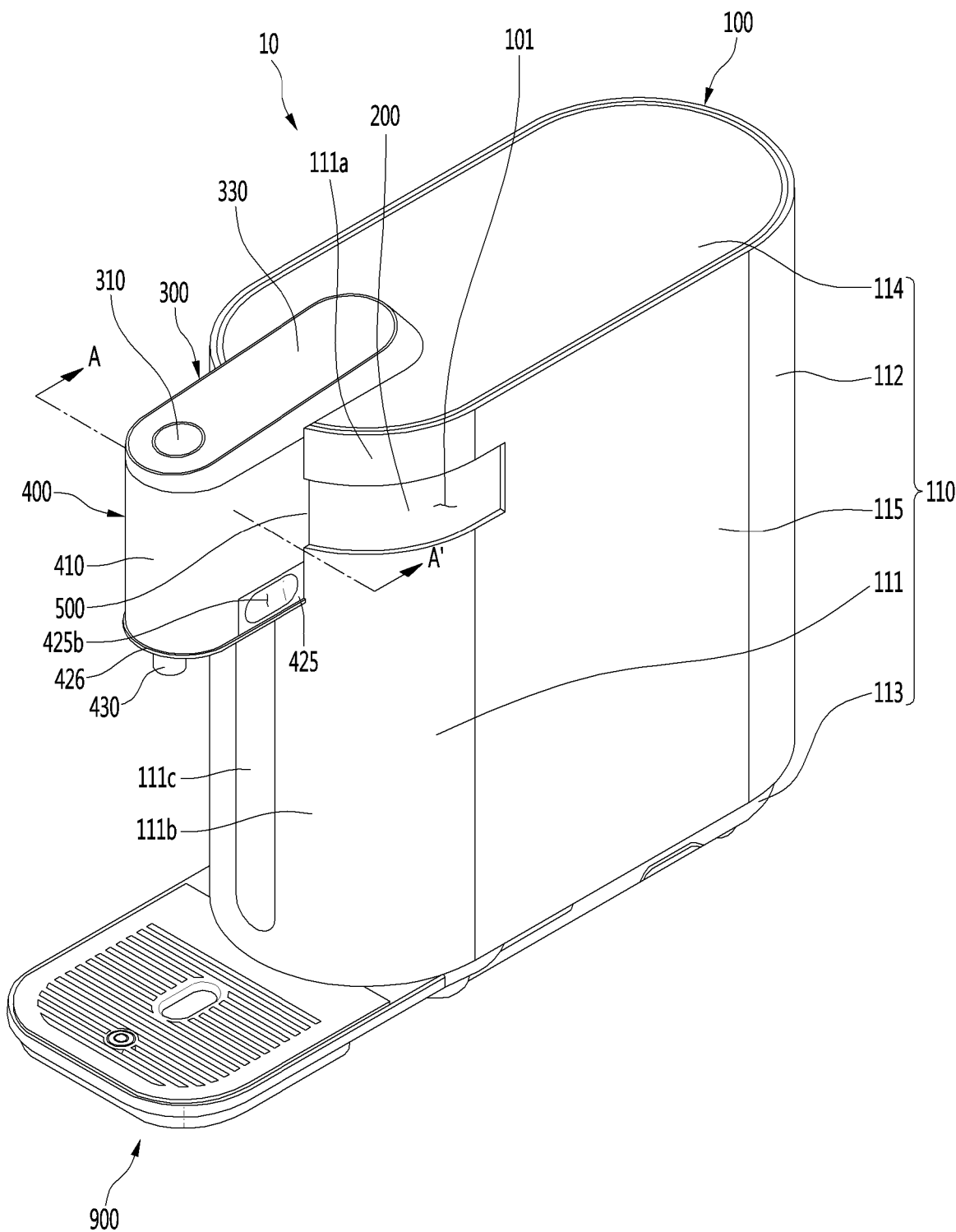
FIG. 2 is a perspective view of a purification device according to one embodiment of the present disclosure.
Figure 3:
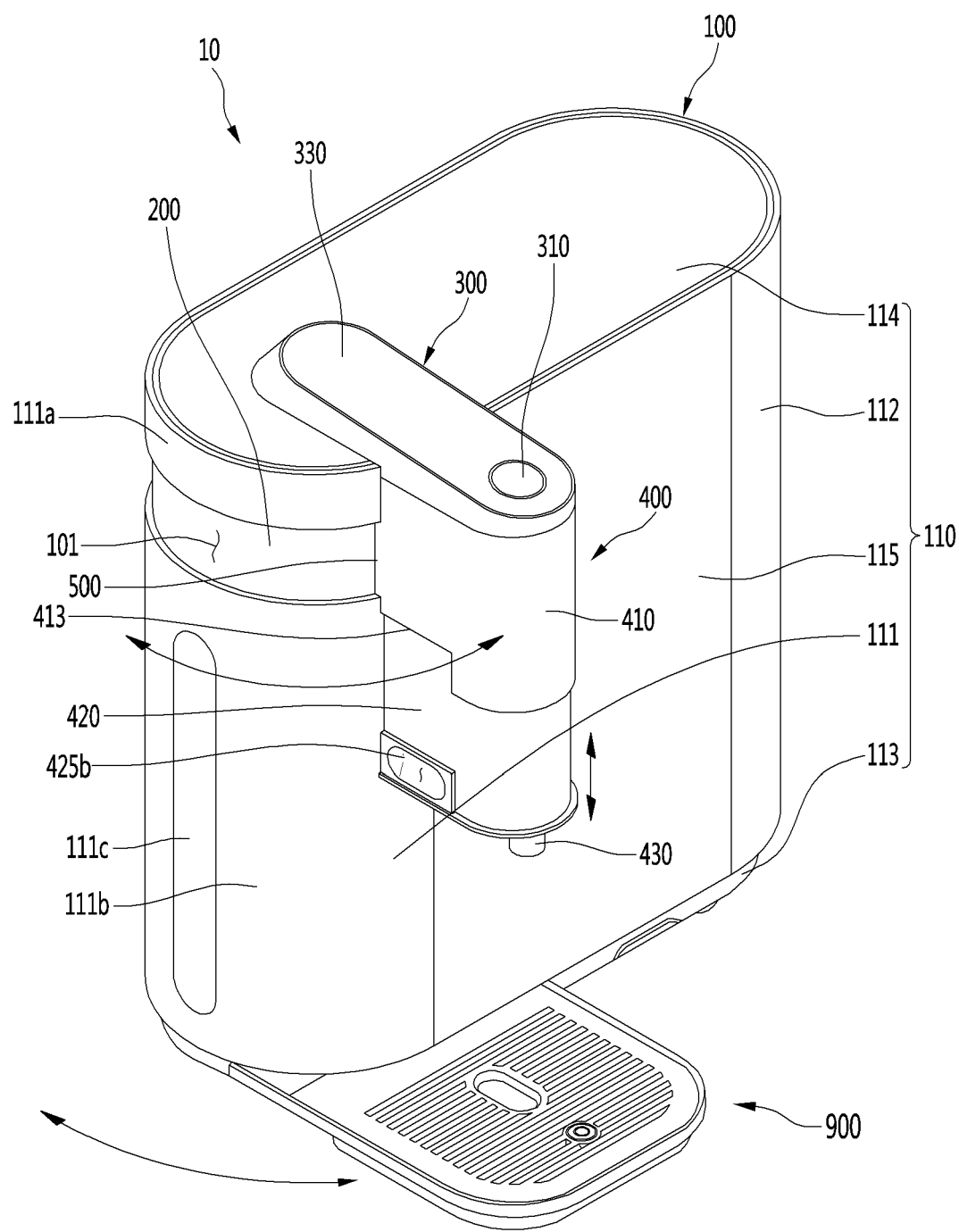
FIG. 3 is a perspective view showing a state in which a position of the water-outlet nozzle of the purification device has been changed according to one embodiment of the present disclosure.

FIG. 2 is a perspective view of a purification device according to one embodiment of the present disclosure. FIG. 3 is a perspective view showing a state in which a position of the water-outlet nozzle of the purification device has been changed according to one embodiment of the present disclosure.

Referring to FIGS. 2 to 3, the purification device according to one embodiment of the present disclosure may include a main body 100 having an opening 101 opened horizontally in a front-face thereof, a rotator 200 received in the opening 101 and rotatably mounted to the main body 100, a manipulation structure 300 disposed above the rotator 200 and spaced apart from the rotator, wherein at least a portion of the unit 300 protrudes forward of the main body 100, and a water-outlet module 400. The water-outlet module 400 may include a fixed cover 410 fixed to the rotator 200 through the opening 101 and projecting forward of the main body 100 and having a top connected to a bottom of the manipulation structure 300, a vertically-movable cover 420 bearing against the fixed cover 410 and being movable in a vertical direction; and a water-outlet nozzle 430 mounted on a bottom of the vertically-movable cover 420.

According to the present disclosure, the water-outlet module 400 may be rotated in the left-right direction with respect to the main body 100 by the rotator 200. In addition, the vertically-movable cover 420 and the water-outlet nozzle 430 may be raised or lowered relative to the fixed cover 410 fixed to the rotator 200. Accordingly, the water-discharge nozzle 430 may be displaced in the left-right direction or in the up-down direction.

In addition, the manipulation structure 300 may be rotatably fixed to the top face of the main body 100. A front tip of the manipulation structure 300 may protrude forward of the main body 100 and may be engaged with the top of the water-outlet module 400. Accordingly, when the water-outlet module 400 rotates, the rotator 200 and the manipulation structure 300 connected to the water-outlet module 400 may rotate simultaneously.

In one example, a hollow portion may be formed in the top of the water-outlet module 400. In an inner surface of the module, a protrusion protruding inwardly may be formed. In addition, an inserted portion to be inserted into the hollow portion of the water-outlet module 400 may be formed from the bottom of the manipulation structure 300. A groove may be defined in the outer face of the inserted portion at a position corresponding to the protrusion. Accordingly, when the inserted portion formed from the bottom of the manipulation structure 300 is fitted into the hollow formed in the top of the water-outlet module 400, and the protrusion fits in the groove, the combination of the water-outlet module 400 and the manipulation structure 300 may be achieved. In one embodiment, the main body 100 has the housing 110 and a filter 120 (see FIG. 4).

The external appearance of the purification device 10 may be defined by the housing 110. The housing 110 may include a front-cover 111 defining the appearance of the front-face, a rear-cover 112 defining the appearance of the rear-face, a base 113 defining the bottom face, a top-cover defining the top face 114, and left and right side-panels 115 defining both lateral faces. The front-cover 111, the rear-cover 112, the base 113, the top-cover 114 and a pair of the side-panels 115 may be assembled together to define the appearance of the purification device 10.

In this connection, the front end and the rear end of each of the base 113 and the top-cover 114 may be rounded. Thus, each of the front-cover 111 and the rear-cover 112 may be convexly formed forwardly and rearwardly, respectively so as to have a curvature corresponding to a curvature of the front end and the rear end of each of the base 113 and the top-cover 114. In the housing 110, the filter 120 (see FIG. 4) for purifying raw-water introduced from the outside thereto and discharging the purified water is provided.

In the front face of the main body 100, the water-outlet module 400 is disposed so as to protrude forward therefrom. The purified water passing through the filter may be discharged through the water-outlet nozzle 430 protruding downward from the bottom of the water-outlet module 400. In addition, purified water passing through the filter may be cooled or heated and then supplied to the water-outlet nozzle 430 in the state of cold water and hot water.

In one embodiment, the front-cover 111 may include an upper cover 111a and a lower cover 111b. Further, the upper cover 111a and the lower cover 111b are vertically spaced from each other, and the opening 101 is defined in the space. The opening 101 may be shielded by the rotator 200 rotatably mounted on the main body 100. In this connection, the lower cover 111b may have a planar portion 111c extending in a vertical direction at a central portion thereof.

When the lower cover 111b has the planar portion 111c, this may allow following advantages compared with the case where the entire area of the lower cover 111b is formed convexly forwardly: when a user discharges water, there is an advantage in that the container including the cup may be positioned to a deeper position. There is also an advantage that the container including the cup, etc. may be stably supported.

In addition, when the water-outlet module 400 is rotated, there is the advantage that the module may be centered with reference to the planar portion 111c. In a state where the water-outlet module 400 is rotated left or right, a container including a cup, etc. may be stably supported from a corresponding side panel 115 having a planar shape.

The water-outlet module 400 may be configured to rotate with the rotator 200. Accordingly, the user may rotate the water-outlet module 400 at a desired angle depending on the installation state of the purification device 10 or the installation environment thereof. In addition, the manipulation structure 300 rotatably coupled to the top-cover 114 may be integrally coupled to the water-outlet module 400 and thus rotated with the water-outlet module 400.

In this connection, a user presses a water-discharge button 310 of the manipulation structure 300. The water-discharge button 310 is preferably positioned vertically overlapping the water-outlet module 400 such that the vertical downward force may be applied to the water-outlet module 400 when the water-discharge button 310 is pressed by the user. That is, when the user presses the water-discharge button 310, the vertical downward force is applied to the water-outlet module 400 such that the water-outlet module 400 does not rotate arbitrarily due to the pressing force from the user.

In addition, while the water-outlet module 400 is fixed to the outside of the rotator 200, the module 400 may be capable of moving in a vertical direction. The above-described rotation and vertical-movement operation of the water-outlet module 400 will be described later.

Figure 4:
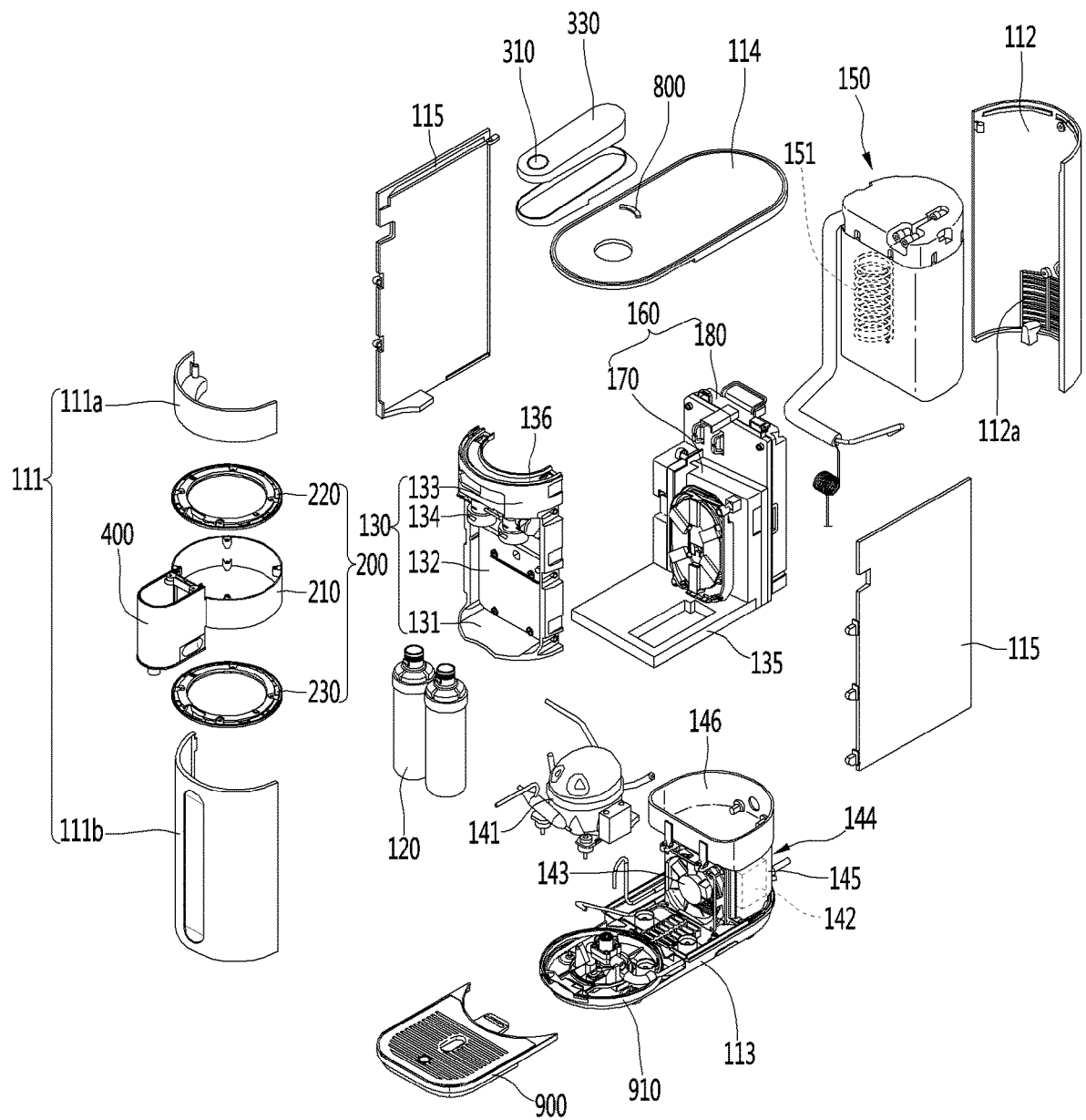
FIG. 4 is an exploded perspective view of the purification device according to one embodiment of the present disclosure.
Figure 5:
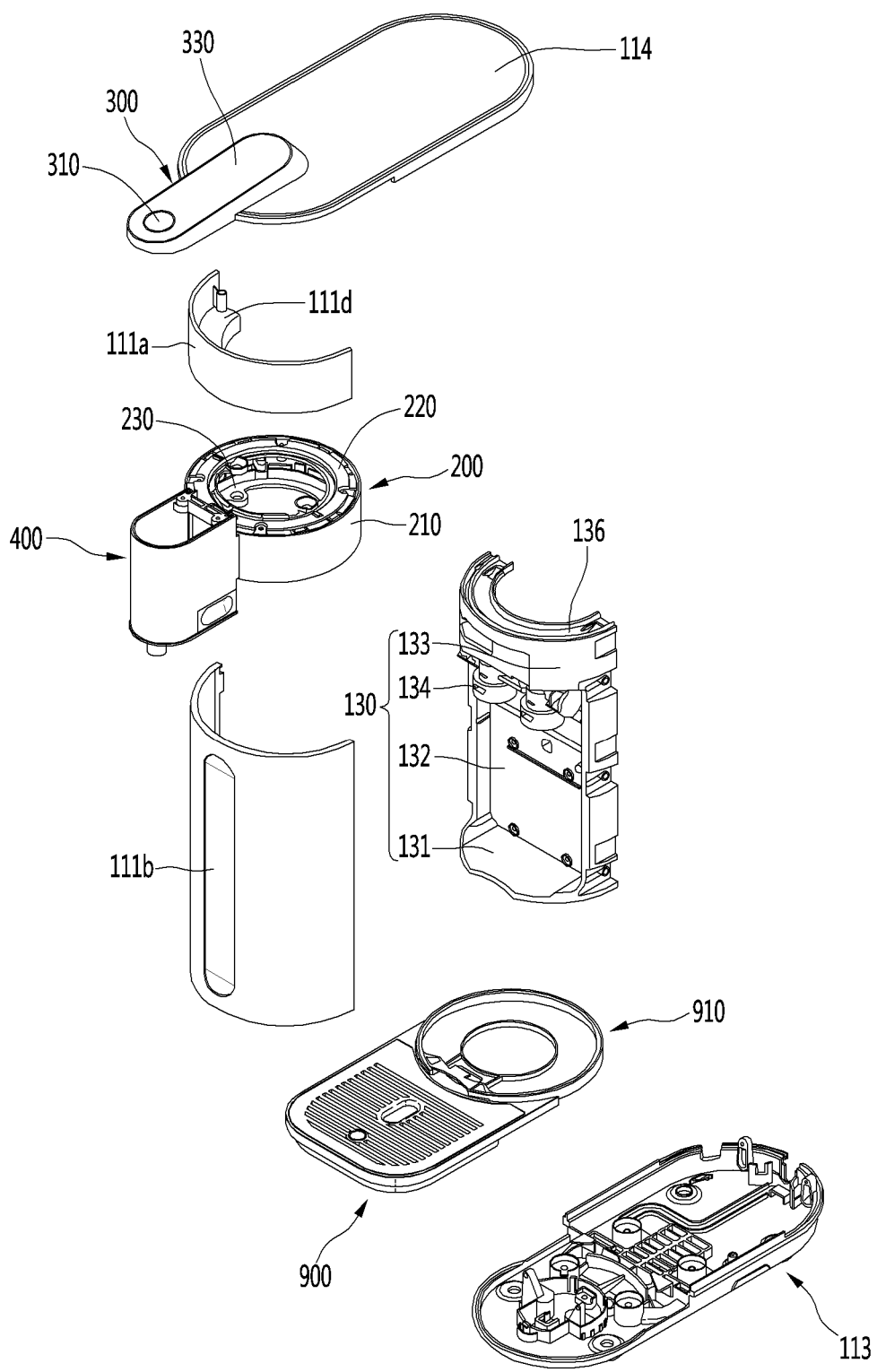
FIG. 5 is an exploded perspective view specifically illustrating a portion of FIG. 4.

FIG. 4 is an exploded perspective view of the purification device according to an embodiment of the present disclosure. FIG. 5 is an exploded perspective view of a portion of FIG. 4. Referring to FIGS. 4 to 5, the housing 110 includes a filter 120 for purification of water and a filter bracket 130 to which a plurality of valves (not shown) are mounted.

The filter bracket 130 may include a bottom portion 131 coupled with the base 113, a filter receiving portion 132 in which the filter 120 is received, and a rotator mount 133 on which the rotator 200 is mounted. The shape of the bottom portion 131 may be formed to correspond to the shape of the tip of the base 113, and the portion 131 may be coupled to the base 113. Thus, the mounting position of the filter bracket 130 may be fixed via the coupling between the bottom portion 131 and the base 113. Further, the bottom face shape of the filter receiving portion 132 may be defined.

The filter bracket 130 may be hooked to the base 113 in a hook manner. The filter bracket 130 may be fixed by a screw fastened to the bottom face of the base 113. The filter receiving portion 132 extends in the vertical direction. The filter receiving portion 132 has a recessed space defined therein from a front side (left side in the figure) to a rear side (right side in the figure) so that the filter 120 may be accommodated therein. A plurality of the filters 120 may be mounted in the filter receiving portion 132. The filter 120 may include a combination of the filters having various functions and may be configured for purifying raw-water (tap water) to be supplied thereto.

Further, the filter receiving portion 132 may further include a filter socket 134 on which the filter 120 is mounted. The filter socket 134 is provided with piping for flowing purified water. The piping may be connected to a plurality of valves (not shown). Thus, the raw-water may pass through the filter 120 in turn and then to a water valve (not shown).

A plurality of valves (not shown) may be provided on the back face (right side in the drawing) of the filter receiving portion 132. The valves (not shown) may supply purified water having passed through the filter 120 to a cooling tank 150 for generating cold water or an induction heating assembly 170 for generating hot water. Furthermore, purified water may be supplied to the water-outlet module 400 immediately.

The rotator mount 133, on which the rotator 200 is rotatably mounted, may be formed on the top of the filter receiving portion 132. In this connection, the rotator mount 133 may be configured to have a curvature corresponding to the curvature of the front cover 111, specifically the lower cover 111b, which covers the front face of the rotator mount 133. Further, the manipulation structure 300 may be disposed on the water-outlet module 400 connected to the rotator 200 and the rotator 200.

In one embodiment, a compressor 113 and a condenser 142 are provided on the top face of the base 113. In addition, a cooling fan 143 is provided between the compressor 141 and the condenser 142 to realize cooling of the compressor 141 and the condenser 142. The compressor 141 may include the compressor of the inverter type capable of adjusting the cooling ability by varying the frequency. Therefore, the cooling of purified water may be efficiently performed, thereby reducing power consumption.

Further, the condenser 142 may be located behind the base 113 and may be located at a position corresponding to a discharge hole 112a defined in the rear-cover 112. The condenser 142 may be realized by bending the flat tube type refrigerant tube many times in order to efficiently utilize the space and at the same time to improve the heat exchange efficiency. The condenser may be configured to be received within the condenser bracket 144.

The condenser bracket 144 may have a condenser mount 145 on which the condenser 142 may be fixed, and a tank mount 146 on which a cooling tank 150 for producing cold water may be mounted. The condenser mount 145 has a space defined therein having a shape corresponding to the overall shape of the condenser 142 so as to accommodate the condenser 142. Further, portions of the condenser mount 145 facing the cooling fan 143 and the discharge hole 112a are opened, respectively, whereby effective cooling of the condenser 142 is possible.

Further, the tank mount 146 is formed on the condenser bracket 144, that is, on the condenser mount 145. The bottom portion of the cooling tank 150 is inserted into the tank mount 146 so that the tank mount 146 fixes the cooling tank 150. The cooling tank 150 may be configured to cool purified water to generate cold water, and, to this end, may be filled with cooling water for heat exchange with the purified water. Further, an evaporator 151 for cooling the cooling water may be accommodated in the cooling tank 150. Further, purified water may pass through the inside of the cooling tank to cool the purified water.

The support bracket 130 is further provided at one side thereof with a support plate 135 extending toward the cooling tank 150. The support plate 135 is provided on the compressor 141. The plate 135 extends from the filter bracket 130 to the condenser bracket 144 to provide a space for receiving the heating and control module 160.

The heating and control module 160 may include an induction heating assembly 170 for generating hot water and a control assembly 180 for controlling the overall operation of the purification device 10. The induction heating assembly 170 and the control assembly 180 may be coupled to each other to form a single module. The induction heating assembly 170 and the control assembly 180 may be mounted on the support plate 135 in the combined state into the single module.

The induction heating assembly 170 is configured to heat purified water and to operate in induction heating (IH) mode. The induction heating assembly 170 may heat the water immediately and rapidly at the time of manipulation for hot water discharge. The heating assembly controls the output of the magnetic field so that purified water may be heated to a target temperature and supplied to a user. Thus, depending on the user's manipulation, the hot water at the target temperature may be discharged.

The control assembly 180 may be configured to control the operation of the purification device 10. The assembly 180 may be configured to control the compressor 141, the cooling fan 143, various valves and sensors, the induction heating assembly 170, and the like. The control assembly 180 may be configured as a module by a combination of PCBs (printed circuit boards) divided into a plurality of functional parts. In addition, when the purification device 10 discharges only cold water and purified water, a PCB for controlling the induction heating assembly 170 may be omitted. In this manner, the at least one PCB may be omitted.

Figure 6:
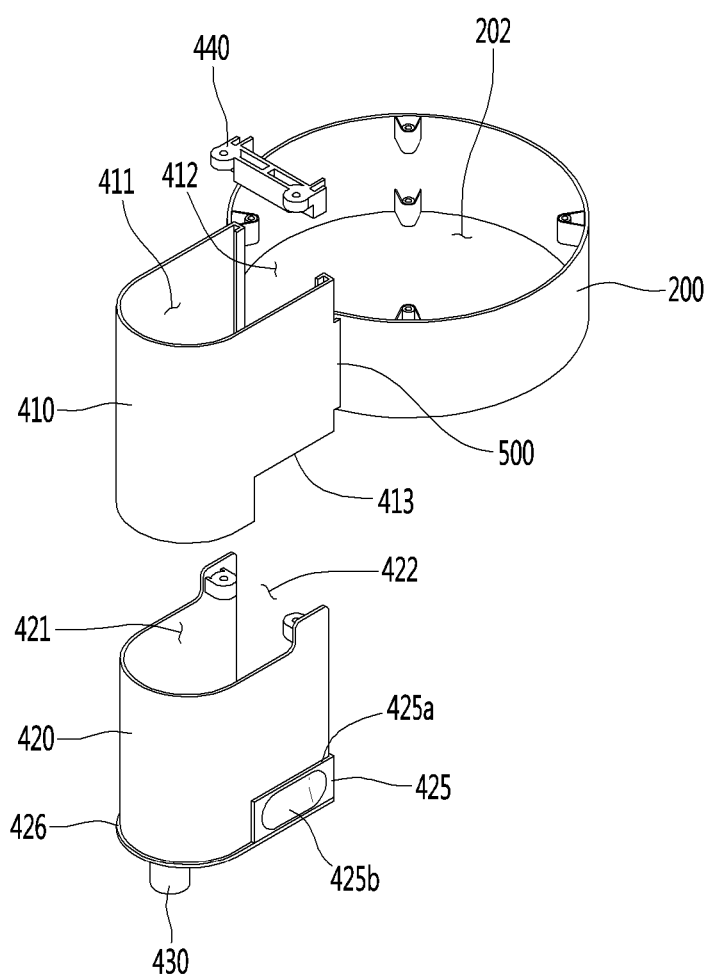
FIG. 6 is an exploded perspective view of a water-outlet module as one component of the present disclosure.
Figure 7:
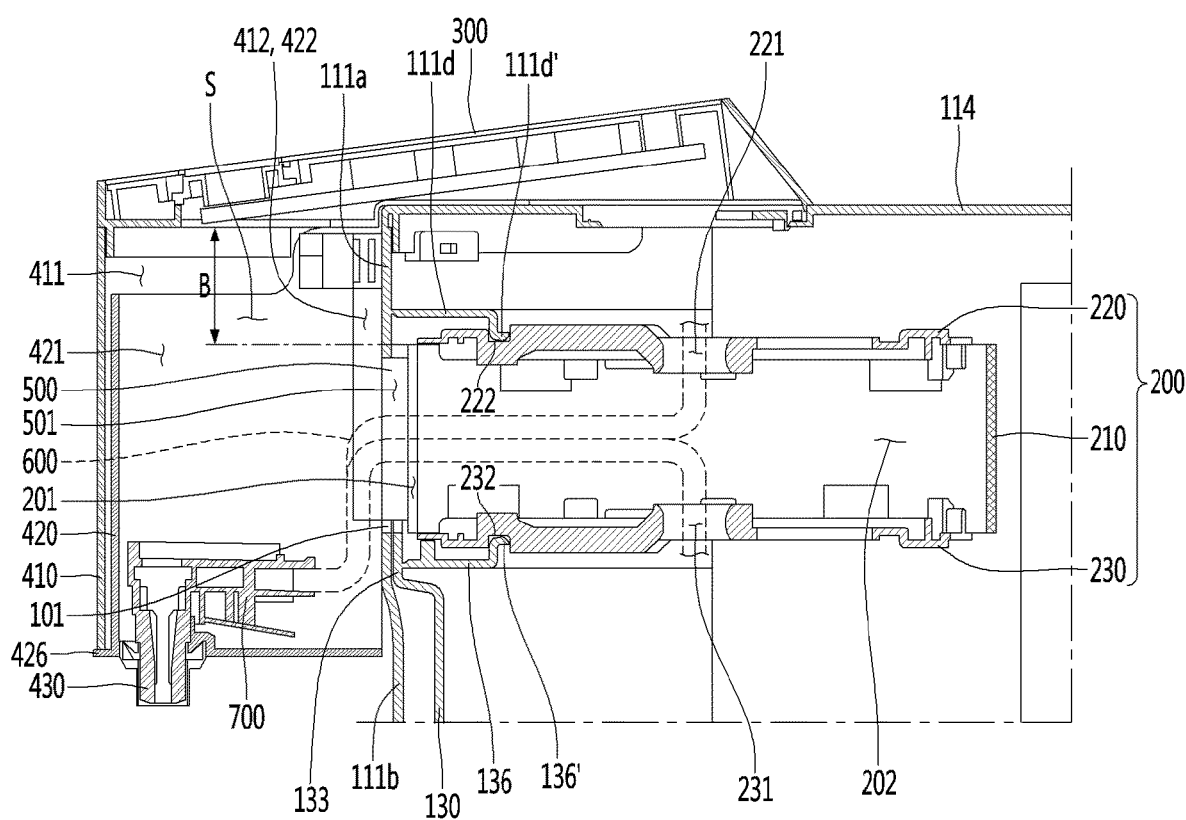
FIG. 7 is a vertical cross-sectional view of the purification device according to one embodiment of the present disclosure.
Figure 8:
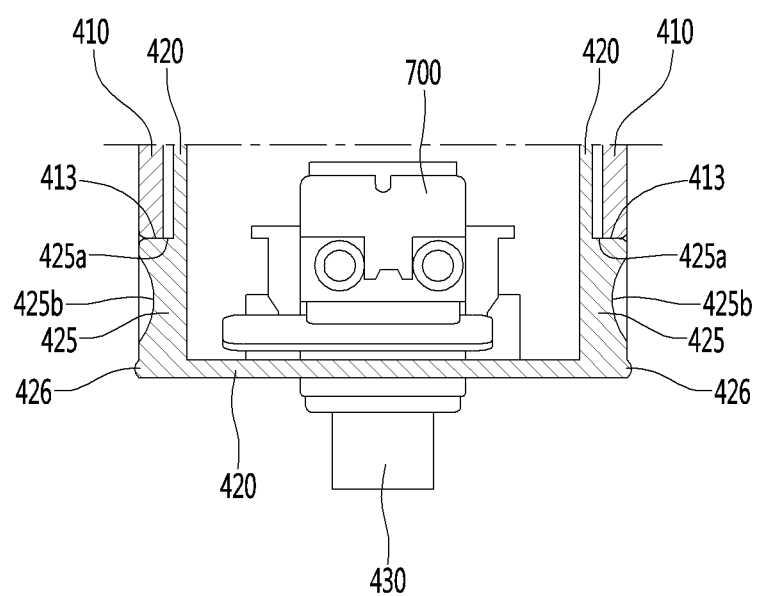
FIG. 8 is a cross-sectional view taken along a line A-A' of FIG. 2.

Hereinafter, the water-outlet module, which is a main component of the present disclosure, is illustrated. FIG. 6 is an exploded perspective view of the water-outlet module as a component of the present disclosure. FIG. 7 is a vertical cross-sectional view of the purification device according to one embodiment of the present disclosure. FIG. 8 is a cross-sectional view taken along the line A-A' in FIG. 2.

Referring to FIG. 6 to FIG. 8, the water-outlet module 400 may include the front-cover fixed cover 410, the vertically-movable cover 420, and the water-outlet nozzle 430. The fixed cover 410 is secured to the rotator 200 disposed within the main body 100 through the opening 101 defined in the front cover 111. The cover 410 protrudes forward of the main body 100, and the top of the cover 410 is connected to the bottom of the manipulation structure 300. The vertically-movable cover 420 is movable up and down while being supported by the fixed cover 410. The water-outlet nozzle 430 is mounted on the bottom of the vertically-movable cover 420.

The water-outlet nozzle 430 is coupled to the bottom of the vertically-movable cover 420. When the vertically-movable cover 420 ascends and descends along the fixed cover 410, the position (height) in the vertical direction of the water-outlet nozzle 430 may vary. Since as described below, the fixed cover 410 is fixed to the rotator 200, the vertically-movable cover 420 and the water-outlet nozzle 430 connected to the fixed cover 410 may be varied in position in the horizontal direction.

In this connection, the top of the fixed cover 410 is connected to the bottom of the manipulation structure 300. According to this configuration, in a spacing B between the rotator 200 and the manipulation structure 300, an accommodation space S may be defined. The top of the vertically-movable cover 420 may be located in the accommodation space S provided between the rotator 200 and the manipulation structure 300 when the vertically-movable cover 420 is maximally raised.

The length of the vertically-movable cover 420 may be increased by the accommodation space S as described above. As a result, the maximum rise level of the water-outlet nozzle 430 coupled to the vertically-movable cover 420 and the vertically-movable cover 420 may be further higher. In addition, the maximum descending level of the water-outlet nozzle 430 coupled to the vertically-movable cover 420 and the vertically-movable cover 420 may be further lowered. That is, the adjustable height variation of the water-outlet nozzle 430 coupled to the vertically-movable cover 420 and the vertically-movable cover 420 may be larger.

When the top of the fixed cover 410 is connected to the bottom of the manipulation structure 300 as described above, the top of the water-outlet module 400 is primarily supported by the manipulation structure 300 relative to the main body 100. Further, by the rotator 200, the bottom or center of the module 400 may be secondarily supported relative to the main body 100.

Accordingly, the water-outlet module 400 may be more rigidly connected to the main body 100. When the water-outlet module 400 is rotated or lifted, the water-outlet module 400 may be prevented from vibrating. In this embodiment, the device may further include a bridge 500 connecting the rotator 200 and the water-outlet module 400. The bridge 500 integrally connects the rotator 200 and the fixed cover 410. The bridge 500 passes through the opening 101. Both ends of the bridge are fixed to the rotator 200 and the fixed cover 410, respectively.

When the water-outlet module 400 and the rotator 200 are rotated, the bridge 500 moves along the opening 101. In this embodiment, the bridge 500, the tip of the rotator 200 to which the bridge 500 is connected, the back of the fixed cover 410, and the back of the vertically-movable cover 420 (right side of the drawing) may have respectively fluid channels 201, 412, 422, and 501 defined therein, through which a hose may pass. The channels may communicate with each other. When the fluid channels 201, 412, 422, and 501 are defined as described above, the inner space of the main body 100 and the inner space of the vertically-movable cover 420 may communicate with each other.

Accordingly, the hose 600 for supplying at least one of purified water, cold water, and hot water as generated from the main body 100 may be connected to the water-outlet nozzle 430 provided in the vertically-movable cover 420 via the fluid channels 201, 412, 422, and 501. In one example, the hose 600 may include a purified water pipe supplying purified water and cold water, and a hot water pipe supplying hot water. In this connection, the purified water pipe and the hot water pipe are made of a flexible material such as rubber, silicone, or the like, and may be bent or flattened. Thus, the pipe may be adapted to the vertical-movement movement of the vertically-movable cover 420.

When the vertically-movable cover 420 and the water-outlet nozzle 430 are lifted and lowered, the hose 600 may be adapted to the vertical movement of the vertically-movable cover 420, while bending or expanding, within the inner space 421 of the vertically-movable cover 420. Thus, regardless of the height of the vertically-movable cover 420 and the water-outlet nozzle 430, the cold water, purified water and hot water may be supplied to the water-outlet nozzle 430.

In one embodiment, the fixed cover 410 has a vertical-movement enabling space 411 defined therein. The vertically-movable cover 420 is accommodated in the vertical-movement enabling space 411 provided inside the fixed cover 410. The cover 420 may move up and down in the space 411 and thus vary the height of the water-discharge nozzle 430. That is, while the vertically-movable cover 420 is accommodated in the fixed cover 410, the cover 420 moves up and down while entering or exiting the fixed cover 410 through the open bottom of the fixed cover 410.

In one example, when the vertically-movable cover 420 is at its maximum vertical-movement, the vertically-movable cover 420 may be entirely housed within the fixed cover 410. When the vertically-movable cover 420 is raised up as described above, the user holds the vertically-movable cover 420 and pulls the cover 420 downward. Thus, the vertically-movable cover 420 descends while being held in contact with the fixed cover 410. Thus, the cover 420 is exposed to the outside of the fixed cover 410.

Conversely, in a state where the vertically-movable cover 420 is lowered, the user pushes the vertically-movable cover 420 upward. Thus, the vertically-movable cover 420 is lifted up while being accommodated inside the fixed cover 410. In this manner, the vertically-movable cover 420 ascends and descends such that the height of the water-outlet nozzle 430 fixed to the vertically-movable cover 420 may vary.

The outer surface of the vertically-movable cover 420 may be shaped to correspond to the shape of the vertical-movement enabling space 411 of the fixed cover 410. In one embodiment, the at least portion of each of the fixed cover 410 and the vertically-movable cover 420 may have an arc-shaped cross-section. Alternatively, the fixed cover 410 and the vertically-movable cover 420 may have a circular cross-section. In detail, the fixed cover 410 and the vertically-movable cover 420 may be formed such that the front-face thereof is convexly forwardly arcuate. In another example, the at least portion of each of the fixed cover 410 and the vertically-movable cover 420 may have a straight cross-section. Alternatively, the fixed cover 410 and the vertically-movable cover 420 may have various cross-sectional shapes.

Figure 9:
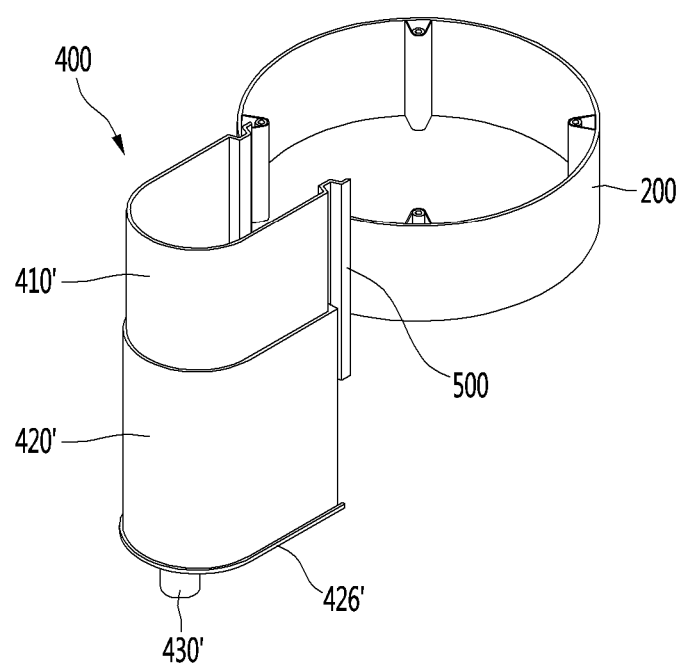
FIG. 9 is a perspective view illustrating a vertical movement of a water-outlet module in a purification device according to another embodiment of the present disclosure.

FIG. 9 is a perspective view illustrating a vertical movement of a water-outlet module in a purification device according to another embodiment of the present disclosure. Referring to FIG. 9, a vertically-movable cover 420' may act as an outer cover, while the fixed cover 410' may act as an inner cover disposed within the vertically-movable cover 420'. Specifically, the vertically-movable cover 420' has a vertical-movement enabling space defined therein. The fixed cover 410' is received within the vertical-movement enabling space defined within the vertically-movable cover 420'.

Accordingly, the vertically-movable cover 420' may be vertically moved while contacting and supporting the outer face of the fixed cover 410'. Accordingly, the vertical level of the water-outlet nozzle 430' may be varied. That is, the vertically-movable cover 420' is provided on the outer side face of the fixed cover 410'. When the vertically-movable cover 420' descends, the fixed cover 410' is gradually exposed to the outside. When the vertically-movable cover 420' rises, the fixed cover 410' is gradually inserted into the vertically-movable cover 420'.

In one example, when the vertically-movable cover 420 is at its maximum elevation, the fixed cover 410' may be completely housed inside the vertically-movable cover 420'. When the user holds the vertically-movable cover 420' in a state where the vertically-movable cover 420' has been elevated up as described above and pulls the cover 420' downward, the vertically-movable cover 420' is lowered while being held in contact with the fixed cover 410', whereby the fixed cover 410' is exposed to the outside.

Conversely, when the user pushes the vertically-movable cover 420' upward in a state where the vertically-movable cover 420' has been lowered down, the fixed cover 410' is housed inside the vertically-movable cover 420', and the vertically-movable cover 420' is lifted up. In this way, the vertically-movable cover 420' moves vertically such that the vertical level of the water-outlet nozzle 430' fixed to the vertically-movable cover 420' may vary.

In one example, the appearance of the vertically-movable cover 420' may be shaped to correspond to the shape of the fixed cover 410'. In one embodiment, at least a portion of each of the fixed cover 410' and the vertically-movable cover 420' may have an arc-shaped cross-section, or may have a circular cross-section.

In another example, each of the fixed cover 410 and the vertically-movable cover 420 may have at least a portion of a straight cross-section. Alternatively, each of the fixed cover 410' and the vertically-movable cover 420' may have various cross-sectional shapes.

Referring again to FIGS. 2 to 9, in order to lower the vertically-movable cover 420 or 420' from a state in which the vertically-movable cover 420 or 420' is elevated as described above, the user grasps the vertically-movable cover 420 or 420' and pulls the movable cover 420 or 420' downwards. In addition, in order to raise the vertically-movable cover 420 or 420' from a state in which the vertically-movable cover 420 or 420' is lowered, the user grasps the vertically-movable cover 420 or 420' and pulls the movable cover 420 or 420' upwards.

In this connection, when the hand slides on the vertically-movable cover 420 or 420', the downward manipulation and upward manipulation of the cover may be not realized. Furthermore, as the hand slides on the vertically-movable cover 420 or 420', the hand may contact the water-outlet nozzle 430 or 430' mounted on the vertically-movable cover 420 or 420'. As a result, the water-outlet nozzle 430 or 430' may be contaminated. Moreover, the user's hand may be injured.

Therefore, according to the present disclosure, a stopping protrusion 426 or 426' protruding outward from the bottom of the vertically-movable cover 420 or 420' may be formed to prevent such hand slippage. When as described above, the stopping protrusion 426 or 426' are formed, the user securely vertically moves the vertically-movable cover 420 or 420' while grasping the vertically-movable cover 420 or 420'. That is, as the user's hand is caught by the stopping protrusion 426 or 426', the clamping force of the user's hand may be secured.

Therefore, when the user holds the vertically-movable cover 420 or 420' and then the user vertically moves the vertically-movable cover 420 or 420', the user's hand may be prevented from slipping on and along the vertically-movable cover 420 or 420'.

In one example, the fixed cover 410' is received within the vertically-movable cover 420'. When the vertically-movable cover 420' moves vertically, the fixed cover 410' may protrude above the vertically-movable cover 420'. Further, in terms of the cross section, the width of the stopping protrusion 426' is formed to be the largest, while the width of the fixed cover 410' is the smallest. The width of the vertically-movable cover 420' is smaller than the width of the stopping protrusion 426' and greater than the width of the fixed cover 410'.

In this connection, the stopping protrusion 426' is formed to protrude from the outer bottom face of the outer vertically-movable cover 420'. The user may grasp the stopping protrusion 426' and vertically move the vertically-movable cover 420'. In another example, the vertically-movable cover 420 is received within the fixed cover 410. When the vertically-movable cover 420 is vertically moved, the vertically-movable cover 420 protrudes downward below the fixed cover 410.

Further, in terms of the cross section, the width of the stopping protrusion 426 is the largest, while the width of the vertically-movable cover 420 is the smallest. The width of the fixed cover 410 is smaller than the width of the stopping protrusion 426 and greater than the width of the vertically-movable cover 420. In this connection, the stopping protrusion 426 protrudes from the outer face of the fixed cover 410. The user may grip the stopping protrusion 426 and vertically move the vertically-movable cover 420.

In one embodiment, the stopping protrusion 426 or 426' may be formed entirely or partially along the outer circumference of the vertically-movable cover 420 or 420'. In one example, the stopping protrusion 426 or 426' may not be formed on the rear-face of the vertically-movable cover 420 or 420' facing the main body 100. Rather, the stopping protrusion 426 or 426' may be formed only on the front-face and both lateral faces as exposed to the outside.

Since as described above, the rear-face of the vertically-movable cover 420 or 420' faces the main body 100, the user cannot grip the rear-face of the vertically-movable cover 420 or 420'. Accordingly, the stopping protrusion 426 or 426' may not be formed on the rear-face of the vertically-movable cover 420 or 420'.

The stopping protrusion 426 or 426' may be formed entirely or partially on and along the front-face and both lateral faces of the vertically-movable cover 420 or 420' as exposed outwardly. Alternatively, the stopping protrusion 426 or 426' may be formed regularly or irregularly on and along the front-face and both lateral faces of the vertically-movable cover 420 or 420' as exposed outwardly. In addition, at least a portion of the stopping protrusion 426 or 426' may have a cross-section of an arc shape.

According to this shape, the surface of the stopping protrusion 426 or 426' is smoothly maintained by the hand, thereby improving the grip feeling. Furthermore, the stopping protrusion 426 or 426' may be made of a material having a frictional force.

Moreover, in the embodiment where the vertically-movable cover 420 is received within the fixed cover 410, when the vertically-movable cover 420 is raised up to the highest vertical level, the stopping protrusion 426 may be in contact with the bottom of the fixed cover 410 and may serve as a stopper.

In addition, on each of the both side bottom faces of the vertically-movable cover 420, an outwardly projecting grip portion (or grip protrusion) 425 may be formed. In each of both bottom portions of the fixed cover 410, a receiving cutout 413 in which the grip portion 425 is seated may be formed.

In this connection, a shoulder 425a may be formed at a top edge of the grip portion 425. Thus, when the user grasps the grip portion 425, and lifts the vertically-movable cover 420 upward and then reaches the highest vertical level, the shoulder 425a of the grip portion 425 may be seated in and contact the receiving cutout 413.

The combination of the receiving cutout 413 and the grip portion 425 may serve as a stopper for restricting the rise of the vertical level of the vertically-movable cover 420. In addition, the grip portion 425 may have a grip groove 425b concavely defined therein.

When the grip groove 425b is formed as described above, the user may grasp the grip groove 425b and lower or raise the vertically-movable cover 420. In this connection, the user may lower or lift the vertically-movable cover 420 without slipping on the grip portion. In this embodiment, the stopping protrusion 246 may be formed to protrude outward from the bottom side face of the grip portion 425.

Thus, while the vertically-movable cover 420 is fully housed within the fixed cover 410, the user may grip the stopping protrusion 426 and lower the vertically-movable cover 420. In addition, the vertically-movable cover 420 may be received within the fixed cover 410, and the grip portion 425 may be flush with a corresponding lateral face of the fixed cover 410.

Since, with this configuration, the grip portion 425 does not protrude outside the fixed cover 410 while the vertically-movable cover 420 is completely housed in the fixed cover 410, a beauty of the device is excellent. According to the present disclosure, when the user moves the vertically-movable cover 420 or 420' up and down, the user's hand holding the vertically-movable cover 420 or 420' is prevented from slipping on and along the cover.

Figure 10:
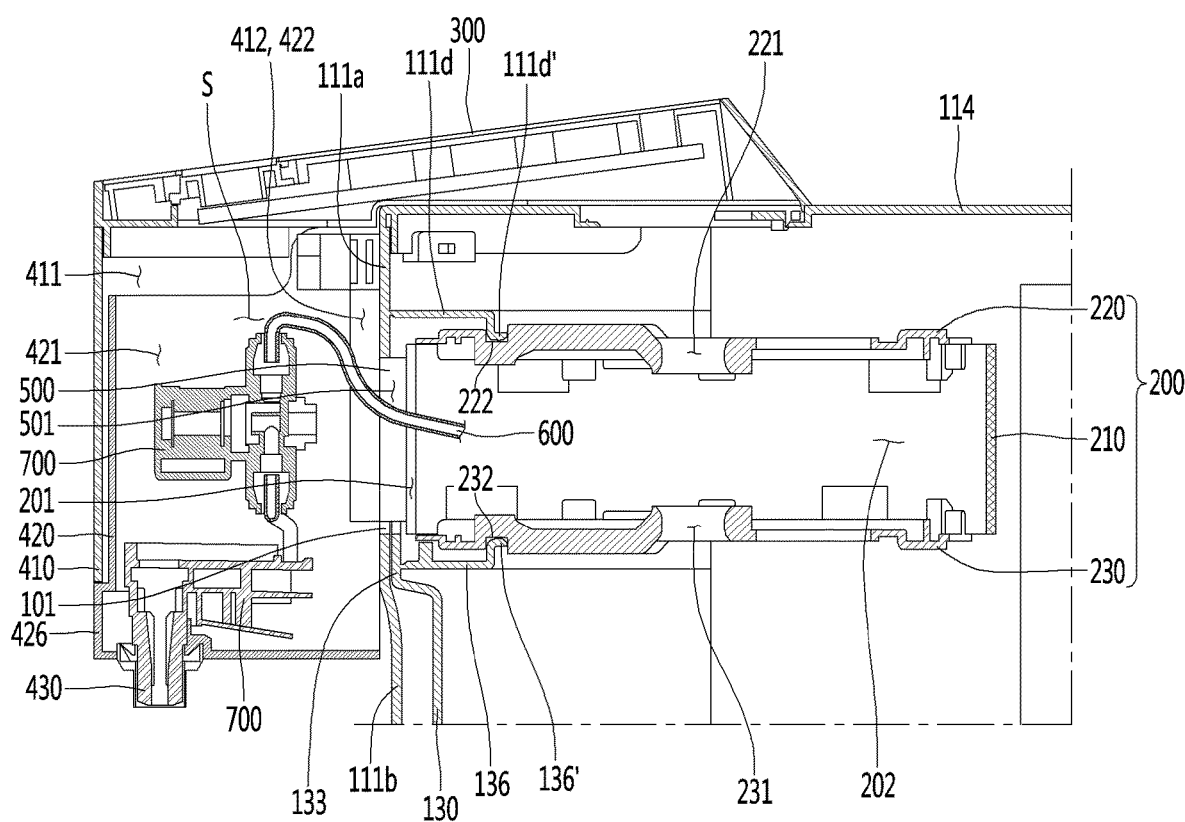
FIG. 10 is a vertical cross-sectional view of a purification device according to another still embodiment of the present disclosure.

FIG. 10 is a vertical cross-sectional view of a purification device according to still another embodiment of the present disclosure. Referring to FIG. 10, the water-outlet module 400 may include a water-supply hose 600. One end of the water-supply hose 600 is connected to the inside of the main body 100 while the other end thereof is connected to the water-outlet nozzle 430 inside the vertically-movable cover 420. Accordingly, at least one of purified water, hot water, and cold water as generated from the main body 100 may be supplied to the water-outlet nozzle 430. The water-outlet module 400 may include a valve 700. The valve 700 may be disposed within the vertically-movable cover 420 and may be disposed above the water-discharge nozzle 430 and may be installed on the water-supply hose 600 to control the flow of water through the water-supply hose 600.

When the valve 700 for controlling the flow of water is mounted inside the vertically-movable cover 420, utilization of space of the water-outlet module 400 may be increased. In addition, the internal space of the main body 100 may have a relatively larger room to spare compared to a case when the valve 700 is installed in the main body 100. Thus, the main body 100 may be downsized. Moreover, the water-outlet nozzle 430 may be closer to the valve 700. Thus, the discharge of the water supply of the purified water, hot water, cold water may be executed immediately.

Conventionally, a valve 700 is installed inside the main body 100. In this case, when the user requests the discharge of water, the valve 700 is opened, and, then, water is supplied from the valve 700 to the water-outlet nozzle 430.

Therefore, in such a conventional case, upon the water discharge request from the user, the distance over which the water flows may be larger.

However, when, according to the present disclosure, the valve 700 is disposed near the water-outlet nozzle 430, a path of the water flow between the valve 700 and the water-outlet nozzle 430 is significantly reduced. Thus, as the length of the water path is reduced, the supply of water may proceed more quickly.

In one embodiment, the water-supply hose 600 supplies at least one of purified water, hot water, and cold water generated from the main body 100 to the water-discharge nozzle 430. In one example, the water-supply hose 600 may serve as a purified water pipe for supplying purified water or cold water generated from the main body 100.

In another example, the water-supply hose 600 may serve as a hot water pipe for supplying hot water generated from the main body 100. In this case, the water-supply hose 600 may be connected to a hot water module, one end of which is installed in the main body 100. The valve 700 may serve as a hot water valve for controlling the flow of hot water supplied from the hot water module to the water-discharge nozzle 430.

In this connection, the hot water module refers to heating means provided in the main body 100 for heating purified water to hot water. In one example, the hot water module may refer to the induction heating assembly 170. In this embodiment, the hot water valve 700 may be disposed closer to the water-outlet nozzle 430. Thus, hot water discharge may be performed immediately.

Specifically, in the standby mode of the purification device, the water-supply hose 600 existing between the hot water valve 700 and the induction heating assembly 170 installed in the main body 100 has been already filled with hot water. In this state, when the user requests the discharge of hot water, the hot water valve 700 is opened, and, then, tot water is supplied to the water-outlet nozzle 430 disposed closer to the hot water valve 700.

In this connection, since the hot water valve 700 is disposed closer to the water-outlet nozzle 430, the hot water flow path between the hot water valve 700 and the water-outlet nozzle 430 can be significantly reduced. Thus, the hot water supply may be made faster in a corresponding manner to the reduced length. In addition, since the hot water flow path between the hot water valve 700 and the water-outlet nozzle 430 is significantly reduced, the temperature of the hot water as discharged from the water-outlet nozzle 430 may be kept higher.

In the conventional case, since the hot water valve 700 is installed in the main body 100, the hot water flow distance between the hot water valve 700 and the water-outlet nozzle 430 has to be larger. Thus, while the hot water flows from the hot water valve 700 to the water-outlet nozzle 430, the temperature of the hot water is lowered.

According to the present disclosure, the hot water valve 700 is installed in the water-outlet module 400 equipped with the water-discharge nozzle 430. Thus, when the hot water is discharged, the hot water flow distance is minimized, thereby minimizing the temperature loss of the hot water. As a result, the user can more rapidly discharge the hot water through the water-discharge nozzle 430, as compared to the conventional case.

Aspects of the present disclosure provide a purification device in which a vertical level of the water-outlet nozzle may be freely adjusted, and vertical level adjustment of the water-outlet nozzle may be easy. Moreover, aspects of the present disclosure provide a purification device in which the user may grasp and vertically move the vertically-movable cover without grip slippage thereon.

In addition, aspects of the present disclosure provide a purification device in which when the vertically-movable cover rises to the maximum vertical level, the rise of the vertically-movable cover may automatically be limited. Furthermore, aspects of the present disclosure provide a purification device in which in the course of vertically moving the vertically-movable cover, the user's hand may be prevented from sliding along the vertically-movable cover, thus, preventing the hand from contacting the water-outlet nozzle, thereby sanitizing the water-outlet nozzle.

In addition, aspects of the present disclosure provide a purification device in which in the process of vertically moving the rotator and movable cover equipped with the water-outlet nozzle, the feeling of manipulation felt by the user may be improved. In addition, aspects of the present disclosure provide a purification device which may be hygienic and which may prevent breakage and deformation of the water-outlet nozzle.

In addition, aspects of the present disclosure provide a purification device in which while rotating the water-outlet nozzle, the vertical and horizontal positions of the water-outlet nozzle may be freely adjusted. In addition, aspects of the present disclosure provide a purification device in which the manipulation unit is rotated together with the water-outlet nozzle so that the convenience of manipulation may be secured. In addition, aspects of the present disclosure provide a purification device in which a hot water valve for supplying hot water is disposed in the water-outlet module so that the user may receive hot water more quickly.

In one aspect of the present disclosure, a purification device may comprise: a main body, and a water-outlet module, wherein the module includes a fixed cover fixed to the main body so as to protrude forward of the main body, a vertically-movable cover moving vertically while bearing against the fixed cover, and a water-outlet nozzle mounted on a bottom of the vertically-movable cover, wherein a stopping protrusion protrudes outward from a bottom lateral face of the vertically-movable cover.

In one implementation of the device, the vertically-movable cover is received within the fixed cover, wherein while the vertically-movable cover vertically moves down, the vertically-movable cover protrudes below and out of the fixed cover. In one implementation of the device, the stopping protrusion protrudes toward an outer face of the fixed cover.

In one implementation of the device, the stopping protrusion extends at least partially on and along an outer circumference face of the vertically-movable cover. In one implementation of the device, when the vertically-movable cover reaches a maximum vertical level thereof, the stopping protrusion bears against a bottom of the fixed cover.

In one implementation of the device, a grip portion protrudes outwardly from each of both bottom lateral faces of the vertically-movable cover. In one implementation of the device, a grip groove is recessed in a corresponding grip portion.

In one implementation of the device, a receiving cutout is defined in each of the bottom portions of the fixed cover, wherein when the vertically-movable cover reaches a highest vertical level thereof, the grip portion bears against the receiving cutout. In one implementation of the device, the stopping protrusion protrudes outwardly from and extends along and each of both bottom lateral faces of the grip portion.

In one implementation of the device, the vertically-movable cover is received within the fixed cover, wherein the grip portion is flush with each of the both lateral faces of the fixed cover. In one implementation of the device, the stopping protrusion at least partially extends in an arc-shape.

In one implementation of the device, the fixed cover is received within the vertically-movable cover, wherein when the vertically-movable cover moves down vertically, the fixed cover protrudes above and out of the vertically-movable cover. In one implementation of the device, the fixed cover is secured to a rotator that is rotatably mounted to the body and within the main body.

In one implementation of the device, the device further includes a manipulation structure disposed on a top of the water-outlet module and on a top of the main body, wherein a water-discharge button is disposed on or in the manipulation structure. In one implementation of the device, the device further includes a hot water valve disposed inside the vertically-movable cover to selectively open and close a hot water pipe for supplying hot water to the water-outlet nozzle.

According to the present disclosure, the following aspects are available. First, in accordance with an aspect of the present disclosure, a vertical level of the water-outlet nozzle may be freely adjusted, and vertical level adjustment of the water-outlet nozzle may be easy. Moreover, in accordance with an aspect of the present disclosure, the user may grasp and vertically move the vertically-movable cover without grip slippage thereon.

In addition, in accordance with an aspect of the present disclosure, when the vertically-movable cover rises to the maximum vertical level, the rise of the vertically-movable cover may automatically be limited. Furthermore, in accordance with an aspect of the present disclosure, in the course of vertically moving the vertically-movable cover, the user's hand may be prevented from sliding along the vertically-movable cover, thus, preventing the hand from contacting the water-outlet nozzle, thereby sanitizing the water-outlet nozzle.

In addition, in accordance with an aspect of the present disclosure, in the process of vertically moving the rotator and movable cover equipped with the water-outlet nozzle, the feeling of manipulation felt by the user may be improved. In addition, an aspect of the present disclosure provides a purification device which may be hygienic and which may prevent breakage and deformation of the water-outlet nozzle.

In addition, in accordance with an aspect of the present disclosure, while rotating the water-outlet nozzle, the vertical and horizontal positions of the water-outlet nozzle may be freely adjusted. In addition, in accordance with an aspect of the present disclosure, the manipulation unit is rotated together with the water-outlet nozzle so that the convenience of manipulation may be secured. In addition, in accordance with an aspect of the present disclosure, a hot water valve for supplying hot water is disposed in the water-outlet module so that the user may receive hot water more quickly.

While the present disclosure has been illustrated with reference to the accompanying drawings, it is to be understood that the present disclosure is not limited to the embodiments and drawings as disclosed in the present specification. It will be obvious that various modifications may be made by those skilled in the art within the scope of the technical idea of the present disclosure. In addition, it should be recognized that other effects from the configurations of the present disclosure should be acknowledged although the other effects is not explicitly described in the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
    a main body including:
        a housing;
        a filter provided inside the housing to filter liquid; and
        a rotator mount having an arc shape;
    a rotator rotatably coupled to the rotator mount; and
    an outlet including:
        a first cover fixedly coupled to the rotator, wherein at least a portion of the first cover protrudes frontward from a front face of the main body, and the first cover defines a first inner space therein;
        a second cover defining a second inner space therein, wherein the second cover has at least one lateral face that includes a grip protrusion configured to enable a vertical manipulation of the second cover, the second cover is received within the first cover, and the second cover is positioned to contact an inner face of the first cover and to be vertically movable while contacting the first cover;
        an outlet nozzle provided at a bottom of the second cover to supply liquid, the outlet nozzle being moved vertically based on the vertical manipulation of the second cover; and
        a stopping protrusion that extends outward from and along a bottom lateral face of the second cover and toward an outer face of the first cover,
    wherein each of the first cover and the second cover includes a rounded front face,
    wherein the grip protrusion extends outwardly from the bottom lateral face of the second cover,
    wherein a receiving cutout is defined in the first cover,
    wherein, when the second cover is moved to a highest vertical level thereof, a portion of the grip protrusion contacts the receiving cutout, and a portion of the stopping protrusion contacts a bottom of the first cover,
    wherein the stopping protrusion protrudes outwardly from and extends along a bottom lateral face of the grip protrusion, and
    wherein the second cover is received within the first cover, and the grip protrusion extends to be flush with a lateral face of the first cover.

2. The device of claim 1, wherein when the second cover vertically moves down, at least a portion of the second cover protrudes below and out of the first cover.

3. The device of claim 1, wherein the stopping protrusion extends at least partially on and along an outer circumference face of the second cover.

4. The device of claim 1, wherein when the second cover is moved to a highest vertical level thereof, a portion of the stopping protrusion contacts a bottom of the first cover.

5. The device of claim 1, wherein the grip protrusion includes surface that is recessed to define a grip groove.

6. The device of claim 1, wherein the stopping protrusion at least partially extends in an arc shape.

7. The device of claim 1, further comprising:
a hot liquid valve disposed inside the second cover to selectively open and close a hot liquid pipe that supplies a hot liquid to the outlet nozzle.

8. The device of claim 1, further comprising:
a hose connected at one end thereof to the outlet nozzle in the second inner space in the second cover, wherein the hose supplies liquid to the outlet nozzle.

9. A device comprising:
a main body including a housing defining an outer appearance of the device; and
an outlet including:
  a first cover fixedly coupled to the main body, wherein at least a portion of the first cover protrudes frontward from the main body, and the first cover defines a first inner space therein;
  a second cover that is received with the first inner space of the first cover and is slidably coupled to the first cover, wherein the second cover defines a second inner space therein, and wherein the second cover includes a stopping protrusion that extends outward from and along a bottom of an outer surface of the second cover and toward an outer face of the first cover, and a grip protrusion extending from the outer surface and configured to enable a vertical manipulation of the second cover; and
  an outlet nozzle provided at a bottom of the second cover to supply liquid received via a liquid tube passing through at least one of the first inner space of the second inner space, the outlet nozzle being moved vertically based on the vertical manipulation of the second cover,
wherein each of the first cover and the second cover includes a rounded front face,
wherein the grip protrusion extends outwardly from the bottom lateral face of the second cover,
wherein a receiving cutout is defined in the first cover,
wherein, when the second cover is moved to a highest vertical level thereof, a portion of the grip protrusion contacts the receiving cutout, and a portion of the stopping protrusion contacts a bottom of the first cover,
wherein the stopping protrusion protrudes outwardly from and extends along a bottom lateral face of the grip protrusion, and
wherein the second cover is received within the first cover, and the grip protrusion extends to be flush with a lateral face of the first cover.

10. The device of claim 9, wherein when the second cover vertically moves down, at least a portion of the second cover protrudes below and out of the first cover.

11. The device of claim 9, wherein the stopping protrusion at least partially extends in an arc shape below the first cover.

12. The device of claim 1, wherein the discharge button rotates with the first cover.

* * * * *